UNITED STATES PATENT OFFICE.

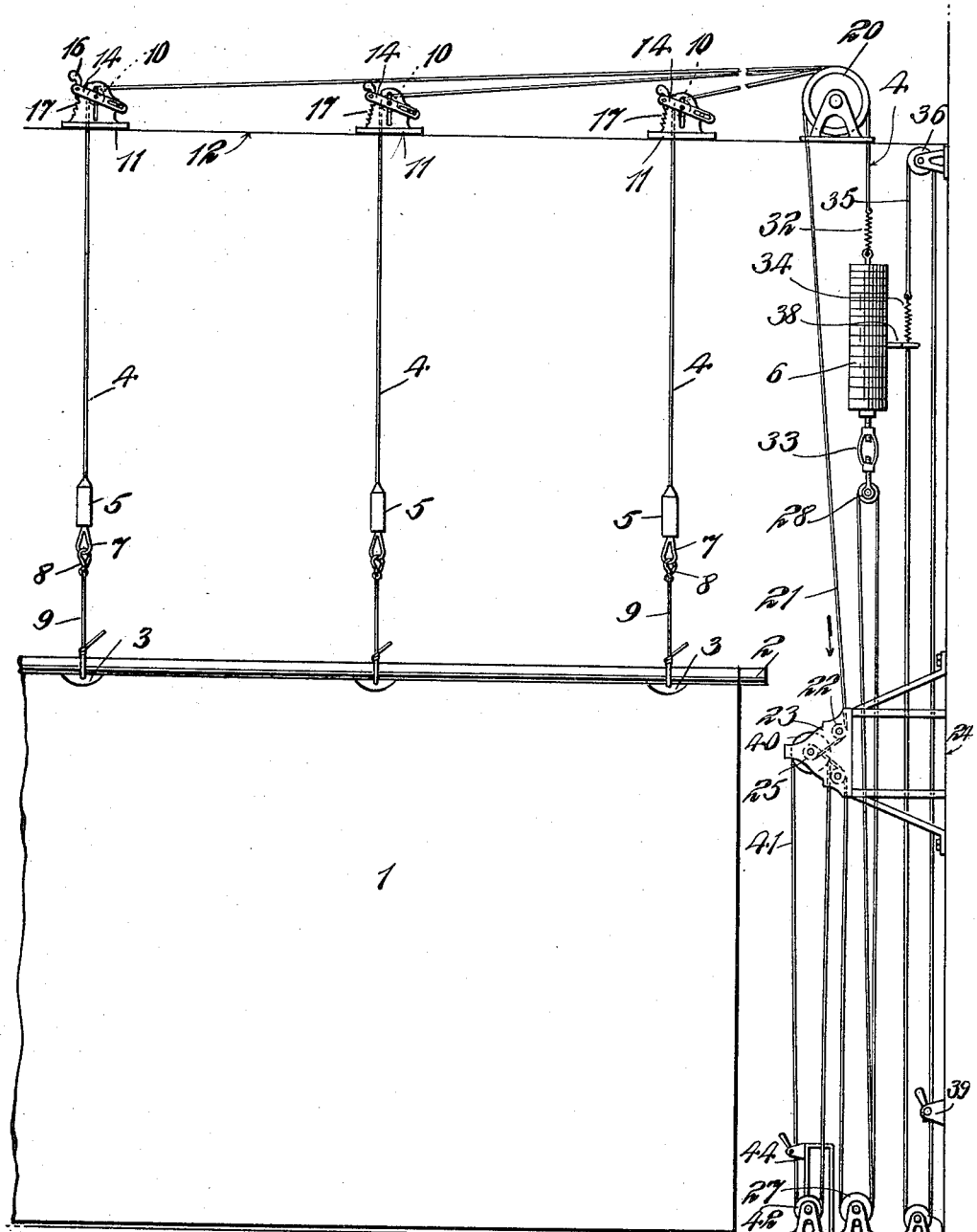

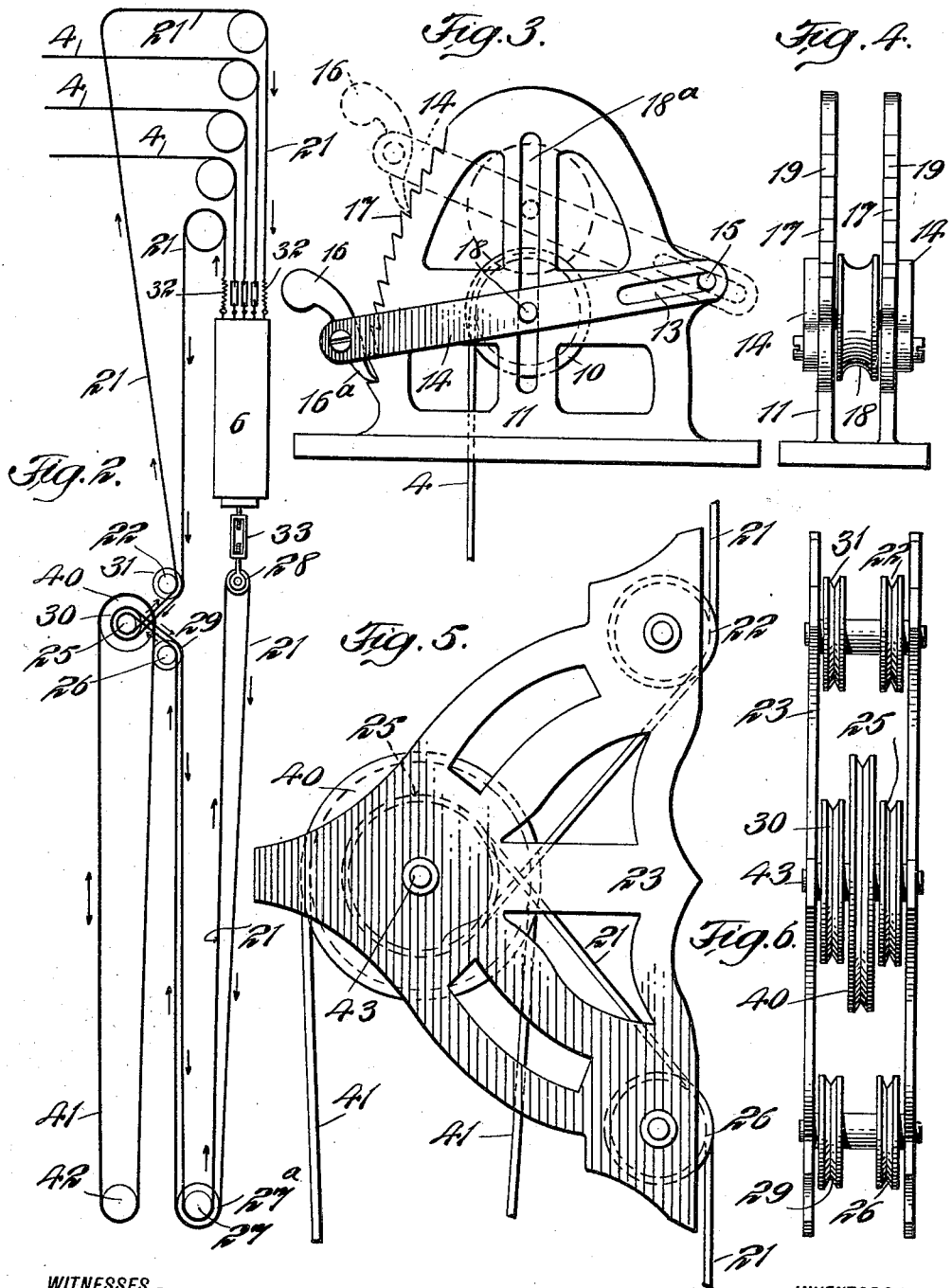

CHARLES F. AUTENRIETH AND RICHARD CHANDLER, OF BROOKLYN, NEW YORK.

THEATRICAL APPLIANCE.

1,008,516.  Specification of Letters Patent.  Patented Nov. 14, 1911.

Application filed December 2, 1908. Serial No. 465,713.

*To all whom it may concern:*

Be it known that we, CHARLES F. AUTENRIETH and RICHARD CHANDLER, citizens of the United States of America, residing at the borough of Brooklyn, in the county of Kings and State of New York, have invented certain new and useful Improvements in Theatrical Appliances, of which the following is a specification, reference being had therein to the accompanying drawing.

This invention relates to counterweighting machinery for manipulating theatrical scenery, our object being to provide mechanism which will greatly reduce time, expense and labor in shifting such scenery, and which will be more positive in its action, and safer and stronger and more reliable than anything heretofore devised for the purpose.

The invention consists in certain novel features in construction and in combinations and arrangements of parts as more fully and particularly set forth hereinafter.

In the accompanying drawing, Figure 1 represents a side elevation of our complete invention as applied to a single drop or piece of scenery, the latter being shown in lowered adjustment. Fig. 2 is a diagrammatic view showing the manner in which the various suspension and other lines are run. Figs. 3 and 4 are side and end views of our improved floor-block, and Figs. 5 and 6 are side and end views of the hanger for the driving and retaining pulleys.

The reference numeral 1 represents what is known to the art as a drop or fly which consists merely of a single piece of scenery for which our apparatus is adapted to be used in the operation of raising and lowering it. This piece of scenery is provided with the usual batten 2 which slips in a sleeve in the top of the scenery, and around which the supporting lines are adapted to pass, notches 3 being cut in the top of the scenery for the rope to pass through.

4, 4, 4 are a plurality of suspension lines preferably composed of wire rope of a size and quality having more or less flexibility in order to pass freely over the pulleys above. The curtain ends of these lines are provided with weights 5, 5, 5 which keep the lines taut when the fly is detached, and they also help to overcome the large counterbalance 6 which is attached to the opposite ends of lines 4 and help to prevent the ropes from running back when the fly is detached. Below each weight 5 is a loop 7 suitably lined and protected with metal. This loop receives a snap hook 8 on the upper end of a short tie rope 9 adapted to be first wound around and fastened to the batten before the curtain is attached to the suspension lines. There are necessarily three of these small tie ropes and their hooks, and they are tied around the batten, preferably at equidistant points, so that the latter can be trimmed in relation to the stage floor 45 with nicety. The suspension lines 4 pass up and over the sheaves 10 in floor-blocks 11 on an overhead grid 12 in a manner common to the art. This grid is sometimes called a fly gallery.

It is quite necessary to shorten and lengthen the curtain ends of the suspension lines 4 in the operation of trimming a fly, and the work must be done as quickly as possible. To accomplish this, we have provided improved manual means for more rapidly lifting or lowering each line 4. These means consist of a stationary floor-block 11 in which a sheave 10 is hung so that the latter, and the line it carries, can be raised and lowered bodily by hand by a flyman going rapidly over the grid 12 from floor-block to floor-block making adjustments at different points. Each sheave is journaled in a pair of hand levers 14 adapted to be raised and lowered by means of a handle 16 and held at various points by a pawl 16ª and an arc-shaped ratchet 17. The levers are provided with elongated slots 13 into which two fulcrums 15 on opposite sides of the floor-block pass, whereby the levers will slide endwise in order to accommodate the pawls 16ª to the curved ratchet 17. It is necessary to have a pair of levers 14 in which the sheave 10 is centered, in order to supply a true bearing for the hubs 18 which move in vertical guide slots 18ª. The fulcrums 15 do not extend across the opening between the two sides 19 of the floor-block; if they did they would interfere with the lateral stretch of the suspension line 4 during the rise and fall of the sheave 10. It is apparent that the form of the levers for lifting the sheave vertically might be varied in a great many ways, and we therefore do not wish to limit ourselves to the precise construction herein shown, our main object being to provide a quicker individual take up mechanism. This quick action is a great desideratum in cases where a large number of flies or pieces of scenery are used, and greatly assists in rapidly shifting the scenery. The three suspension lines pass over the sheaves and extend laterally to a large overhead drum 20, provided with individual grooves or pulleys for each line, and they then extend down and are attached to a common counterweight 6. As seen in Fig. 2, the means for manipulating the drop, after it has been suspended and adjusted in the foregoing manner, consist of a wire or other suitable kind of rope 21 having its upper end attached to a spring 32 which is in turn secured to the weight 6 from which the line extends upwardly over a pulley on the axis of the drum 20, thence downwardly as shown by arrows along the side of the wall 24 to a grooved idler 22 in a hanger 23 secured to the vertical wall 24. From this idler 22 the driving and retaining rope 21 passes to a driving pulley 25 around which it is looped or coiled one or more times for the purpose of getting a secure grip on the periphery of said pulley 25. It then crosses itself and extends downwardly to an idler 26 from which it passes until it reaches a floor pulley 27 on the floor of the stage, thence upwardly to an adjustable pulley 28 suspended from a turnbuckle 33 on the counterweight 6, and thence downwardly back to a floor pulley 27ª, thence upwardly to an idler 29, and thence to a driving and retaining pulley 30 over which it is looped. From this driving pulley 30 line 21 passes on to the idler 31, thence upwardly and over a pulley on the drum 20, and thence downwardly to the top of the counterweight 6 to which it is attached. We have found in practice that this driving and retaining rope 21, when looped around the various pulleys and idlers as described, needs an elastic tension in order to insure the proper gripping action on the driving pulleys and in order to accommodate itself to the variations which take place in tension. To overcome this difficulty we have provided springs 32 at the ends of the rope 21 where they are attached to the counterweight 6. These springs always maintain the constant tension required to prevent slipping, and they also give a livelier action to the rope while it is being operated. The tension of the rope 21 can also be regulated manually by means of the turnbuckle 33 which is secured to the bottom of the counterweight 6 and carries the pulley 28 around which the long vertical loop of said rope is passed. Hence it will be observed that the rope 21 is secured to pull in opposite directions on counterweight 6, the counterweight being incorporated in the circuit of the rope and moving up and down therewith, and at the same speed, in the operation of raising and lowering the scenery.

As a means for more positively arresting and limiting the fall of the fly 1 at exactly the right height from the stage floor 45, and to prevent the former from folding and creasing, should it descend too low, we have provided an adjustable stop for the fly. This stop consists of a cushioning spring 34 which arrests the upward movement of the counterweight at any predetermined location that will stop the curtain at the proper point over the stage. The upper end of this spring is attached to an endless wire rope 35 which passes over top and bottom pulleys 36 and 37 and through the eye of an eye-bolt 38 screwed into the counterweight. This endless rope 35 may be locked and unlocked by any suitable fastening device, such as 39, that will hold the stop and arrest the weight 6 at the proper moment.

The great advantage of our device as constructed and arranged is that all of the balancing and manipulating ropes at the side of the stage are brought down to the stage floor, or nearly to the floor, or in such close proximity thereto, that they can be readily operated and tested from that point, whereby the usual fly gallery located at the side of the stage and often many feet above the floor is dispensed with. Such fly galleries not only increase the cost of building the stage equipment, but they are in most cases difficult of access and dangerous to be in should a fire take place on the stage.

The driving and weight supporting line 21 is controlled by manual power through the medium of a master pulley 40 and endless hand-rope 41 which passes down and over a floor pulley 42. This master-pulley is keyed to the driving pulley shaft 43 and is situated between the two driving pulleys 25 and 30, as seen more clearly in Fig. 6. A locking cam 44, or other suitable fastener, holds the hand-rope 41 and hence the fly at any height desired.

The operation of our apparatus may be briefly described thus: Assuming that a piece of scenery is to be hung, the operator grasps the right-hand fold of the hand-rope 41 and pulls down upon it. This action revolves the master pulley 40 and driving pulleys 25 and 30 and raises the counterweight 6, thereby allowing the free ends, or curtain ends, of the suspension lines 4 to descend to the stage floor, the small counterweights 5 assisting and keeping the lines taut. The locking cam 44 may now be applied to hold the hand-rope 41 and prevent the master-pulley 40 from revolving. This also arrests the movement of the driving pulleys 25, 30, and the driven line 21, and holds the counterweight 6 stationary. The gripping friction of the line 21 around the driving pulleys 25 and 30 is so great that it cannot slip and allow the counterweight 6 to descend prematurely. The amount of gripping friction on the driving pulleys can be easily regulated by the turnbuckle 33 which raises or lowers the pulley 28 suspended from it, and over which the middle portion of the line 21 is looped. The curtain ends of the suspension lines, having thus been lowered to a position within reach of the stage floor, the fly may be attached by simply hooking the snap-hooks 8 of the tie-ropes 9 into the loops 7 of the lines. The operator may now loosen the locking cam 44 which holds the hand-rope 41 and work the latter in a reverse direction, thereby lowering the counterweight 6 and raising the fly to the desired height. When so raised it is nearly always found that some of the suspension lines are too long or too short and that the fly needs trimming. Therefore it becomes necessary to mutually adjust them in order to trim the fly properly in relation to the stage floor, as previously mentioned, and this we do by simply and quickly lifting the hand-pull 16 of the levers 14, and hence the sheaves 10 in the floor-blocks 11, until the proper adjustment is secured. The fly may now be moved up and down by the hand-rope 41 with the greatest facility by the manual power of one man instead of the gang of men heretofore required.

It is apparent that our device might be varied in many ways which would suggest themselves to those skilled in the art without departing from the scope and spirit of our invention.

Having thus described our invention, what we claim as new and desire to secure by Letters Patent, is:

1. In a theatrical apparatus, the combination with an overhead grid, of a drop trimming mechanism consisting of a plurality of suspension lines attachable to a single drop, individual sheaves on said grid and over which said lines pass, individual hand-pulls connected to lift each sheave bodily and separately in relation to the others, and means for locking said pulls and hence the sheaves at various heights.

2. In a theatrical apparatus, the combination with an overhead grid, of a drop trimming mechanism comprising a floor-block provided with a bodily movable sheave, a hand-lever for raising and lowering the sheave, and locking means connected with the block for locking said lever at various points of adjustment.

3. In a theatrical apparatus, a drop trimming mechanism consisting of a floor-block provided with a bodily movable sheave, an endwise movable lever carrying the sheave, and a pawl and ratchet mechanism for holding said lever at various adjustments.

4. In scenery manipulating devices, in combination, a plurality of suspension lines connected to move in unison and attachable to a drop for moving the same vertically, means for simultaneously operating said lines in unison to raise and lower said drop, and drop trimming means comprising a series of independently operative manually controlled devices for independently moving any one of said lines vertically to correspondingly move an end of said drop for trimming the same independently of said simultaneous operating movement of said lines in unison.

5. In scenery manipulating appliances, in combination, a multiplicity of suspension lines attachable to a single piece of scenery, all of said lines being connected to operatively move in unison and simultaneously in raising and lowering said scenery, operating means for simultaneously moving said lines in unison to raise and lower said scenery, and manually controlled scenery trimming means for separately and individually moving any one of said lines vertically independently of said operative simultaneous movement of said lines in unison.

6. In scenery manipulating appliances, in combination, a multiplicity of counterbalanced suspension lines attachable to a single piece of scenery, said lines being arranged with a series of spaced parallel vertical portions depending to said scenery, operating means for said lines to simultaneously and in unison move said portions vertically to raise and lower the scenery, and a series of separate manually controlled independently-vertically-movable line supports from which said vertical portions of the lines depend and by which any vertical portion can be separately raised or lowered to trim the scenery.

7. In a scenery manipulating device, a plurality of suspension lines attached to a single piece of scenery in combination with means for simultaneously operating said lines in unison, a series of floor-blocks having interadjustable sheaves for independently vertically moving said lines to trim said scenery, a support for the blocks, and counterbalancing mechanism.

8. A scenery manipulating mechanism comprising a plurality of suspension lines attachable at different points to a single piece of scenery, and means for operating them in unison, in combination with an overhead grid provided with a series of floor blocks having interadjustable sheaves for separately moving said lines vertically.

9. In a scenery manipulating mechanism, and in combination with counterweighting devices, a plurality of suspension lines attachable to a single piece of scenery and operatively movable in unison, and a series of independently adjustable separate sheaves individually supporting said lines, respectively, for independently adjusting the same vertically to trim said scenery.

10. In a scenery manipulating mechanism, a plurality of suspension lines attachable to a single piece of scenery and operatively movable in unison, in combination with a series of individual supports for the lines, said supports being independently adjustable in relation to one another for trimming the scenery by raising or lowering each rope separately independently of said operative movement of the ropes in unison.

In testimony whereof we affix our signatures in presence of two witnesses.

CHARLES F. AUTENRIETH.
RICHARD CHANDLER.

Witnesses:
GEO. J. LEITCH,
W. W. TAMLYN.